UNITED STATES PATENT OFFICE.

EDWARD M. EIDHERR, OF ALLEGHENY, PENNSYLVANIA.

PROCESS OF ELIMINATING IMPURITIES FROM COAL, &c.

SPECIFICATION forming part of Letters Patent No. 613,980, dated November 8, 1898.

Application filed December 28, 1897. Serial No. 664,074. (No specimens.)

*To all whom it may concern:*

Be it known that I, EDWARD M. EIDHERR, a citizen of the United States of America, residing at Allegheny, in the county of Allegheny and State of Pennsylvania, have invented certain new and useful Improvements in Processes for the Elimination of Impurities from Coal and Ores, of which the following is a specification.

This invention relates to a certain new and useful process for the elimination of sulfur, phosphorus, arsenic, and antimony from coke, copper, gold, iron, lead, silver, and like ores, and has for its object to increase the profits derived from the dry distillation of bituminous coal, such as illuminating-gas and heating-gas, tar, ammonia, and the like.

The invention further contemplates providing a process which can be used for the manufacturing of coke, either in open (beehive) or closed ovens, retorts, and so-called "by-product" ovens of every system and construction, the latter of course receiving only the benefit of the increase in the by-products.

The elimination of the impurities mentioned above in the ores containing them is accomplished by my improved process through the roasting of the ores in a retort or some entirely-closed device which is provided with an inlet for the steam and chemicals and with an outlet for the arising gases. To prevent the commingling of these gases with the surrounding air, they may be confined in any suitable manner and carried off by introducing them under water with suitable sewerage connections, so that the same may be drained from time to time as necessary.

The chemicals employed in my improved process consist of glycerin and nitric and hydrochloric acids in different proportions as required and introduced with superheated steam in the manner to be specifically set forth, as follows: Glycerin ($C_3H_8O_3$) as tri-atomic alcohol=$\genfrac{}{}{0pt}{}{C_3H_5}{H_3}\Big\}$ $O_3 = C_3H_5 \Big\{\genfrac{}{}{0pt}{}{OH}{OH}{OH}$.

Glycerin has the power to form three (3) alcoholic hydroxyls, and therefore being mixed by high temperature with the impurities it forms the acids of the different elements: first, as glycerin-sulfuric acid, $C_3H_5(OH)_2HSO_4$, with sulfuric acid or any combination of sulfur with hydrogen and oxygen; second, glycerin-phosphoric acid, $C_3H_5(OH)_2H_2PO_4$, with phosphoric-acid anhydrid, ($P_2O_5$;) third, glycerin-arsenic acid, $C_3H_5(OH)_2H_3AsO_4$, with arsenic-acid anhydrid, ($As_2O_3$,) and, fourth, glycerin-antimonic acid, $C_3H_5(OH)_2HSbO_3$, with antimony-acid anhydrid, ($Sb_2O_5$.) All of the glycerin acids are highly volatile and combustible and are destroyed through the heat in the coke-ovens.

Superheated steam becomes dissolved under the influence of a high temperature into its elements, hydrogen and oxygen, the latter producing the chemical combination to form higher degrees of oxidation with sulfur, (S,) phosphorus, (P,) arsenium, (As,) antimony, (Sb,) the hydrogen forming with sulfur sulfureted hydrogen and with phosphor phosphoreted hydrogen, ($P_3H$;) with arsenium arsenated hydrogen, ($AsH_3$;) with antimony antimonieted hydrogen, ($SbH_3$,) all of them easily combustible and volatile.

The hydrochloric acid (HCl) assists in opening and precipitating the silicates and to prepare the chemical combinations of arsenium, antimony, phosphorus, and sulfur with metals and alkalies contained in the coals and ores as dangerous impurities for the work of the nitric acid as the medium for higher oxidation of the different combinations resulting during the process and to bring them in proper shape to act with the glycerin.

The quantity of the chemicals used depends upon the percentage of impurities in the raw material, but by many experiments I have shown the following formula to be satisfactory, providing the raw material does not possess a higher percentage of impurities than ordinarily. Where there is from three to four per cent. of sulfur and the usual amount of arsenium, phosphorus, and antimony, the latter three impurities being contained in but very small quantities in coal and ores, I use to the one ton of raw material twelve ounces glycerin, eight ounces nitric acid, eight ounces hydrochloric acid. These ingredients are introduced into contact with the coal or ores at different times during the coking or roasting process by the aid of the superheated steam. Of these ingredients I take six ounces of glycerin and eight ounces of hydrochloric acid and, mixing the same thoroughly together, introduce them by the aid of the superheated steam into contact with the coal or ores at the time when the aforesaid coal or ores are sufficiently heated. These ingredients are introduced very gradually into the raw material by means of a suitable jet or other device, through which they are forced by the action of the superheated steam. After the gradual introduction of these chemicals the coking or roasting process should not be disturbed for some time, so as to permit the chemicals introduced to act. After a sufficient length of time has been given for this purpose I introduce six ounces of glycerin and eight ounces of nitric acid into contact with the raw material by means of superheated steam in the same manner as aforesaid for the glycerin and hydrochloric acid. These chemicals are evenly and entirely distributed through all portions of the raw material and form the different glycerin products as mentioned before in the chemical formulas. The coking or roasting process is not interrupted after this until just a short time previous to the completion of the coking process. At this time I force a strong current of superheated steam into contact with the product to finish the chemical action.

The usual by-products by the coking process in closed ovens or retorts are increased by the use of the process through a much high production of gases. The first part of the resulting gases being illuminating-gas, the second part is non-illuminating, but of a high heating power, and these gases, if they cannot be used otherwise, can, after washing them, be conducted back to the boiler and used for heating purposes at the coking plant, and thereby save the ordinary cost of fuel. The other usual by-products become increased through the elimination of the impurities. Besides, tar through the use of steam is more easily separated and is of a better quality.

I desire to call attention to the extreme simplicity and the very low cost of the process. Besides, no material has been used that would remain in the coke and ores, all of them being volatile and combustible. Therefore no increasing of the ashes takes places.

Having fully described my invention, what I claim as new, and desire to secure by Letters Patent, is—

1. The herein-described process for the elimination of impurities from coal or ores during the coking or roasting process comprising the introduction into contact with the raw material of glycerin and hydrochloric acid through the action of superheated steam; as and for the purpose set forth.

2. The herein-described process for the elimination of impurities from coal or ores during the coking or roasting process comprising the introduction into contact with the raw material of glycerin and nitric acid through the action of superheated steam, as and for the purpose set forth.

3. The herein-described process for the elimination of impurities from coal or ores during the coking or roasting process comprising the introduction into contact with the raw material of thoroughly-mixed glycerin and hydrochloric acid through the action of superheated steam, and then the introduction into contact with the raw material of glycerin and nitric acid through the action of superheated steam, as and for the purpose set forth.

4. The herein-described process for the elimination of impurities from coal or ores during the coking or roasting process which consists in the introduction of glycerin and nitric acid into contact with the raw material by the aid of superheated steam, and then subjecting the product to the action of superheated steam, substantially as herein set forth.

5. The herein-described process for eliminating impurities from coal or ores during the coking or roasting process comprising the introduction into contact with the raw material of glycerin, nitric acid, and hydrochloric acid through the action of superheated steam, as and for the purpose set forth.

6. The herein-described process for the elimination of impurities from coal and ores during the coking or roasting process, consisting of the introducing into contact with the raw material by the aid of superheated steam, a quantity of glycerin and hydrochloric acid, and later introducing a quantity of glycerin and nitric acid, by the aid of superheated steam, and then subjecting the finished product to the action of the superheated steam, substantially as shown and described.

In testimony whereof I affix my signature in presence of two witnesses.

EDWARD M. EIDHERR.

Witnesses:
A. M. WILSON,
CHAS. T. MOORE.